L. F. LOZIER & R. A., P. S. & W. T. REEDY.
DETACHABLE CENTRIFUGAL DISTRIBUTER FOR MANURE SPREADERS.
APPLICATION FILED JUNE 25, 1912.
1,057,751.
Patented Apr. 1, 1913.
2 SHEETS—SHEET 1.
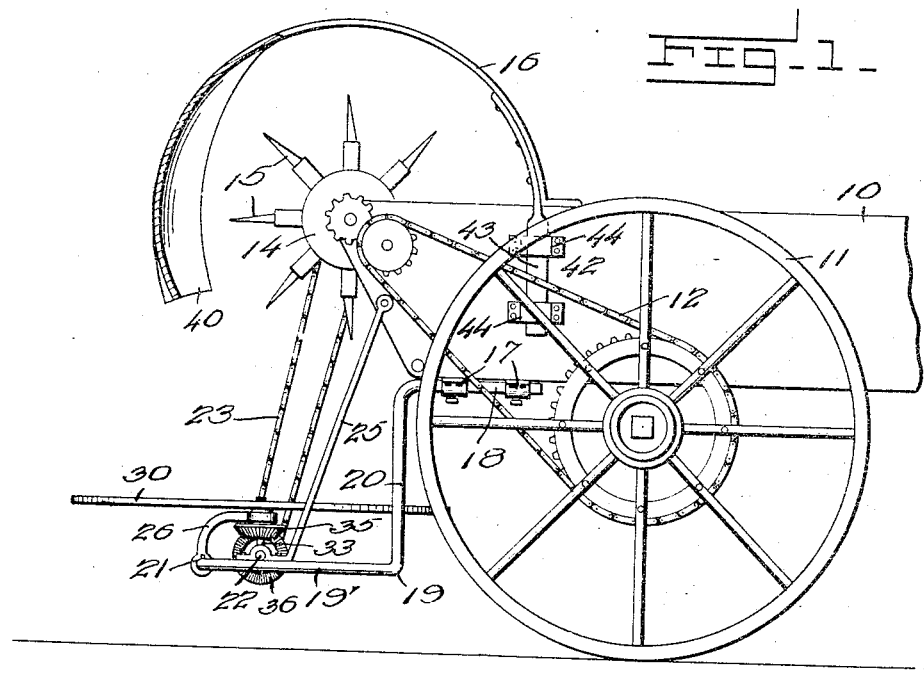
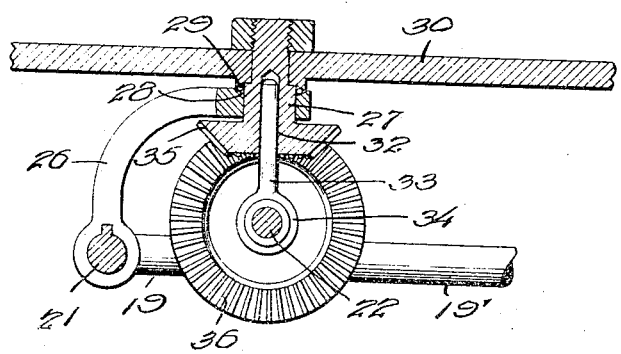

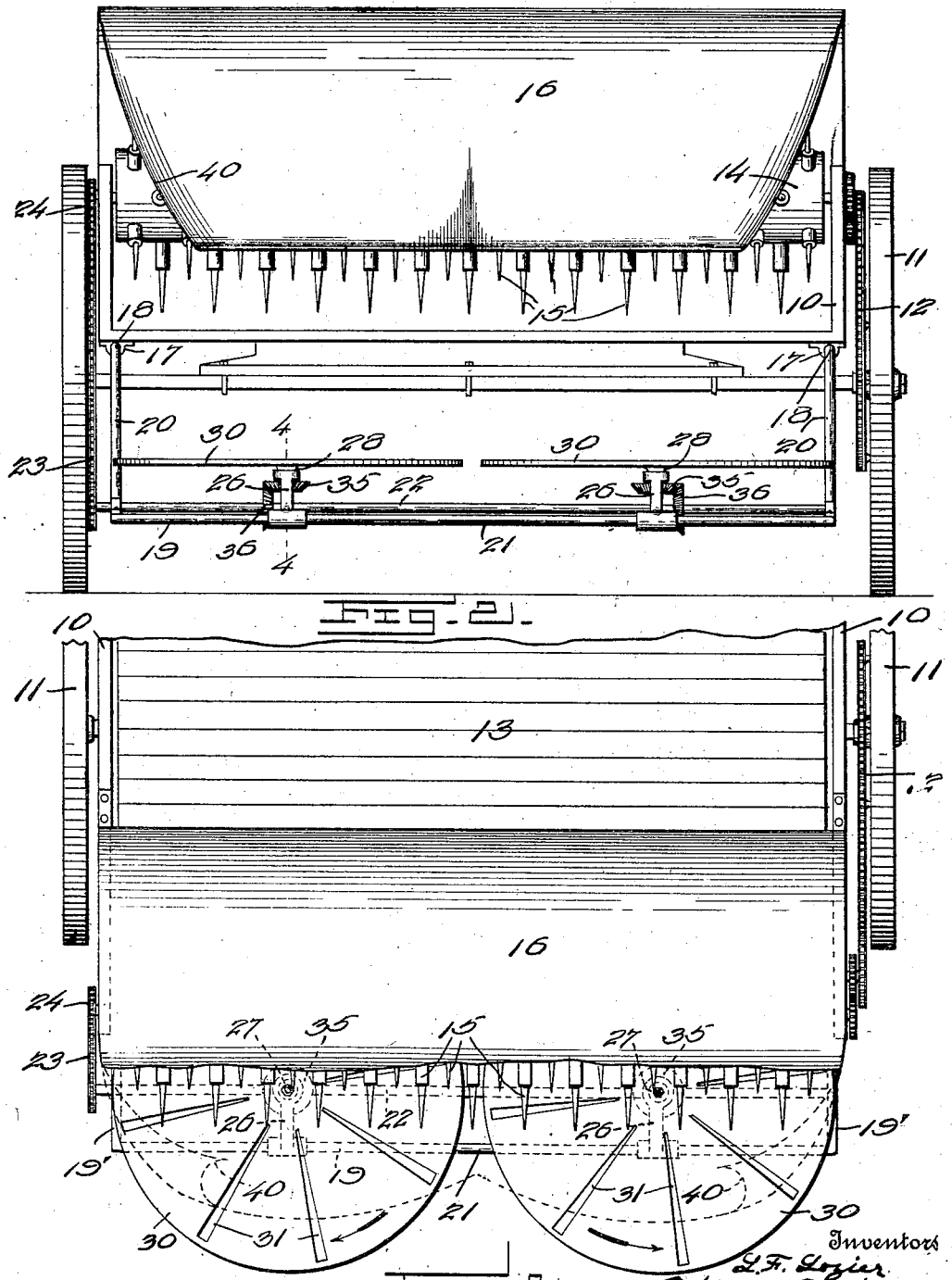

UNITED STATES PATENT OFFICE.

LEHMAN F. LOZIER, RUFUS A. REEDY, PRESTON S. REEDY, AND WALTER T. REEDY, OF EDNA, KANSAS.

DETACHABLE CENTRIFUGAL DISTRIBUTER FOR MANURE-SPREADERS.

1,057,751.  Specification of Letters Patent.  Patented Apr. 1, 1913.

Application filed June 25, 1912. Serial No. 705,729.

*To all whom it may concern:*

Be it known that we, LEHMAN F. LOZIER, RUFUS A. REEDY, PRESTON S. REEDY, and WALTER T. REEDY, citizens of the United States, residing at Edna, in the county of Labette and State of Kansas, have invented new and useful Improvements in Detachable Centrifugal Distributers for Manure-Spreaders, of which the following is a specification.
This invention relates to manure distributing apparatus, and has for its object to provide a centrifugal distributer, especially adapted for application to manure spreaders of the simple type having a conveyer and spiked drum for discharging material only toward the rear, or over an area equaling in width the length of the drum, such as are illustrated in patents to F. W. Rice, June 20, 1911, numbered 995,905, and to L. B. Barth, Dec. 26, 1911, Number 1,012,795, for centrifugal distributing devices, and it is a particular object to enable the use of the centrifugal element or the ordinary spiked drum discharge at will. The centrifugal device might not be found adapted to use where a very heavy layer of manure is to be laid upon the ground, and it is desirable that it be made possible to dispense with the centrifugal elements at times.
Another object is to provide a simple and cheap frame construction for supporting the centrifugal distributing mechanism.

Other objects and advantages will be apparent from the following description, and from the drawings, in which, Figure 1 is a fragmentary side view of a spreader equipped with our invention, Fig. 2 is a rear view thereof, Fig. 3 is a top view, Fig. 4 is a fragmentary sectional view, showing the mounting of one of the distributer disks.

There is illustrated a spreader of ordinary construction including the body portion 10, supported by suitable trucks including rear wheels 11, from which connections are made at 12 to a conveyer 13 and discharge drum 14 respectively. The conveyer operates to carry manure in the body from front to rear conveniently for engagement by the spurs 15 of the drum 14. Extending transversely of the body there is a suitable hood 16 adapted to confine material upon the drum through a portion of its movement, allowing the material to be discharged only at the rear side of the hood.

On the under side of the body 10 there are secured bracket sleeves 17, at each side of the body, adapted to receive slidably respective arms 18 at opposite sides of a frame 19, the sleeves being provided with set screws by which the arms may be secured therein or released. The arms and frame are formed integrally from one piece of stock, which may be either bar iron or piping of suitable weight, substantially U-shaped in plan. The bight portion of the frame extends in a horizontal direction, and at an intermediate point, each side of the frame is bent upward as at 20, and thence horizontally to form the arms 18. The bight is angular in form, including a transverse bar 21 joined to the sides of the frame at a right angle and being integral therewith, as mentioned. Journaled upon the sides 19' of the bight a spaced distance from the bar 21 there is a shaft 22 projecting at one side beyond the frame and provided with a sprocket, from which a chain 23 is extended to the corresponding sprocket at 24 on the shaft of the drum 14. As strap bearings might be used for the journaling of this shaft they may be extended as shown at 25 to form diagonal braces secured by a removable bolt to the side of the body 10 to brace the frame, the fastenings for the bearing thus being sufficient for the securement of the two elements, and the one member made to serve the two functions.

Keyed at properly spaced points on the bar 21, there are gooseneck brackets 26, the upper ends of which are located vertically above the shaft 22, being apertured and receiving downwardly therethrough for rotation the hubs 27 having the recessed shoulders 28 between which and the upper sides of the goosenecks there are ball bearings 29. The goosenecks may be provided with suitable bearing seats for the purpose. The hubs each carry thereon a distributer disk 30, which may be formed in any suitable manner, but preferably of heavy sheet metal stamped to present radial flanges or slots at 31. If the slots are used it may be found desirable to have them extend through the outer edges of the disks, whereby material engaged in the slots may be readily thrown outwardly therefrom under operation. Each of the hubs is provided with the axial bore or socket 32, in which there is revolubly set the spindle 33 having the annular head 34 receiving revolubly therethrough the shaft

22. If desired, a suitable bushing may be interposed. Secured on the lower end of each hub there is a beveled gear 35 meshed with a corresponding gear 36 on the shaft 22.

It will be apparent that a very simple mounting for an awkward operative connection is provided, which is light in weight and durable and it will be apparent that the frame 19 carrying the centrifugal distributing elements may be easily and quickly removed.

If desired, any method of securing the diagonal arm 25 to the body other than the removable bolt, may be used.

It should be noted that the side portions of the hood are curved inwardly as at 40, the inwardly curved portion sloping toward the central part at the bottom, whereby material is fended inwardly and directed upon the central parts of the disks where they are moving laterally with respect to the trucks, whereby efficient distribution of material is assured. Without this means, and if the hood allowed the material to fall the full width of the disks, that part striking upon the outer portions of the disks would be thrown inwardly under the truck body, instead of laterally. Also the central part of the hood is pressed inwardly from the rear, as at 41, whereby the material is prevented to a large extent from falling between the disks without being engaged. The plan of the lower part of the fender is indicated in dotted outline in Fig. 3.

It will be found desirable to make the hood detachable, which may be accomplished as at 42, the base of the hood being provided with a stem 43 adapted to be presented through the strap yokes 44 on the distributer body.

What is claimed is:

1. A removable centrifugal distributer attachment for manure spreaders, comprising holding devices adapted to be secured to a spreader body, a frame having upwardly and forwardly extending arms adapted for removable engagement with the holding devices, horizontal rotatable disks carried by the frame below the level of the supporting body, and operator connections for the disks.

2. A removable centrifugal distributer attachment for manure spreaders, comprising a frame approximately U-shaped in plan, means for securing the arms of the frame removably upon a spreader body, a transverse revoluble shaft mounted intermediately upon the frame, a gooseneck bracket upon the bight of the frame outwardly of the shaft, a hub carried revolubly thereby over the shaft, a distributer disk carried by the hub, a beveled gear carried by the hub, a gear on the shaft meshed with the first named gear, said hub being socketed at its lower end, a spindle member carried revolubly on the shaft and engaged in the socket, and operative connections for the shaft.

3. A removable centrifugal distributer attachment for manure spreaders, comprising a frame approximately U-shaped in plan, the bight portion being approximately horizontal, the intermediate side portions being extended upwardly and the end portions being adapted for detachable engagement with a spreader body, a strap bearing at each side of the frame adjacent the bight, each strap having an upwardly and rearwardly extending portion adapted for engagement with said body above the ends of the frame for bracing thereof, a transverse shaft journaled in the bearings, distributer disks mounted revolubly thereover, operative connections between disks and shaft, and operative connections for the shaft.

In testimony whereof we have hereunto set our hands in presence of two subscribing witnesses.

LEHMAN F. LOZIER.
RUFUS A. REEDY.
PRESTON S. REEDY.
WALTER T. REEDY.

Witnesses:
S. M. NELSON,
S. P. BICKHAM.